June 12, 1928.

C. E. WHEELER ET AL

AUXILIARY SEAT BACK

Filed Oct. 21, 1927

1,673,433

Inventors.
Clarence E. Wheeler
Edward W. Goodlett
by Heard Smith & Tennant.
Attys.

Patented June 12, 1928.

1,673,433

UNITED STATES PATENT OFFICE.

CLARENCE E. WHEELER AND EDWARD W. GOODLETT, OF ALLSTON, MASSACHUSETTS.

AUXILIARY SEAT BACK.

Application filed October 21, 1927. Serial No. 227,797.

This invention relates to an auxiliary cushion or back having for its purpose to assist the occupant of the seat in retaining a correct sitting posture.

When occupying an automobile either as a passenger or as a driver there is a natural tendency for the rider to slump down in his seat and assume a position which while it may be comfortable enough is nevertheless incorrect from a physiological standpoint.

The present invention provides an auxiliary cushion or seat back which may be attached to an automobile seat back or to the back of any seat or chair and which serves to give the occupant a correct sitting posture without in any way decreasing the comfortable feeling of the seat.

In order to give an understanding of our invention we have illustrated in the drawings a selected embodiment thereof which will now be described after which the novel features will be pointed out in the appended claims.

Figure 1:
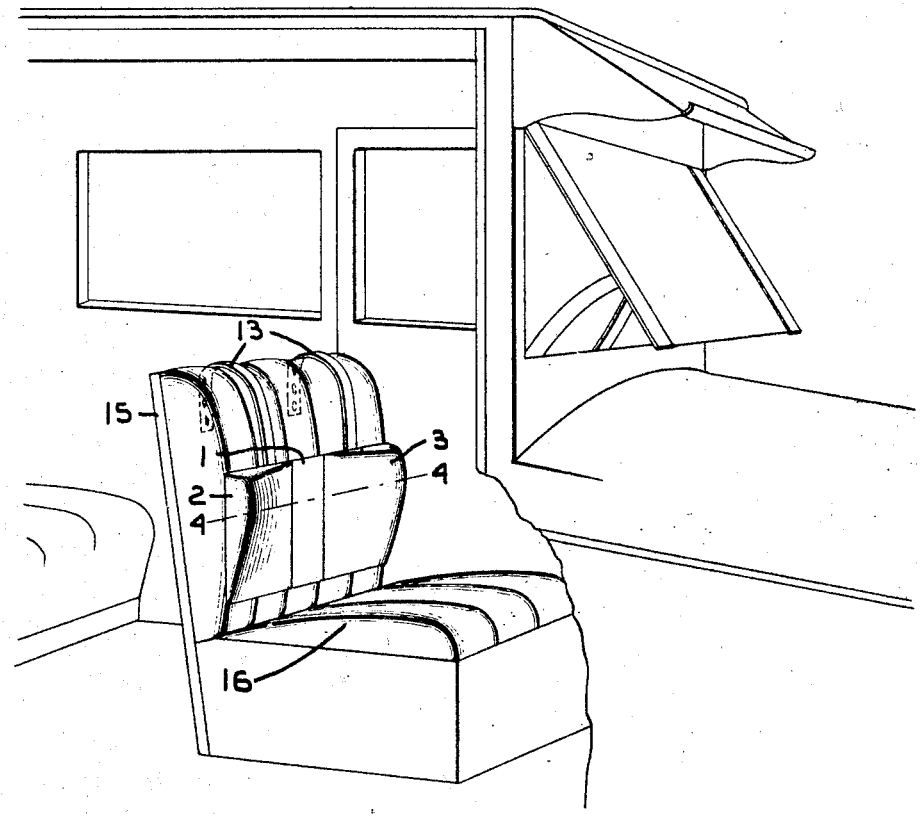
Fig. 1 is a perspective view of a portion of an automobile showing our improved seat back applied thereto.

The cushion or auxiliary back embodying our invention comprises a central section 1 which is relatively stiff and the two wing sections 2 and 3 which are upholstered and which have a special shape. The central section 1 may conveniently be made of a strip 4 of any stiff sheet material. The wing sections 2 and 3 are stuffed with curled hair 5 or any other suitable material and are covered with a covering 6 of leather, cloth, imitation leather or any other desirable material.

In order to give the completed cushion an attractive apperarance we propose to cover the strip 4 with the covering material 6, the covering at the front and back of the cushion extending across the strip 4 and being sewed together on each side of said strip as shown at 7; the stiff strip 4 being thus secured in position between the two wing sections.

Figure 2:
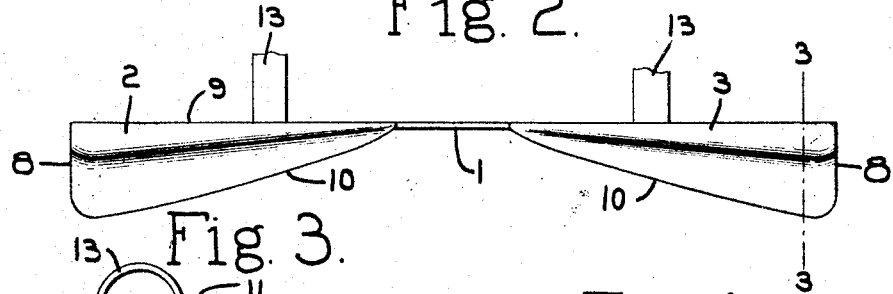
Fig. 2 is a top plan view of the cushion embodying the invention.
Figure 3:
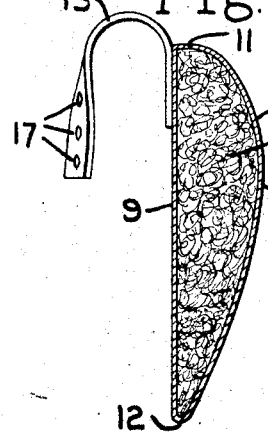
Fig. 3 is a section on the line 3—3, Fig. 2.
Figure 4:
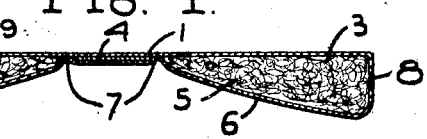
Fig. 4 is a section on the line 4—4, Fig. 1.

Each wing portion 2 and 3 has a progressively increasing thickness from front to rear from the edge of the plate 4 to the outer edge 8. The back face 9 of each wing is a straight face both vertically and horizontally but the front face 10 has a convex shape and as seen in Fig. 2 the point of greatest convexity is nearer the top edge 11 than the bottom edge 12. Hence in a vertical line each wing is thickest at a point nearer the top than the bottom while in a horizontal line each wing has a progressively increasing thickness from its inner edge to its outer edge. The strip 4 serves to maintain the full vertical dimension of the cushion.

Each wing has secured to its upper edge a retaining strap 13. These straps are for the purpose of adjustably supporting the auxiliary cushion at the desired height.

In the drawings we have shown the cushion as it might be used in connection with the back 15 of an automobile seat 16. When used in this way the back face 15 of the seat back will have suitable fastening devices thereon to which the retaining straps 13 may be adjustably secured. These straps may be formed with fastening devices 17 adapted to engage co-operating fastening devices on the back of the seat back 15. The fastening devices may be either in the form of openings or holes in the straps 13 adapted to engage buttons on the back of the seat or may be parts of the well known snap fasteners. We propose to provide a plurality of fastening devices 17 on each strap 13 so as to permit the straps to be adjustably secured to the seat back thereby to place the auxiliary cushion at the desired elevation to fit the occupant of the seat.

The proper adjustment of the auxiliary device would preferably be so that it will fit in the small of the back and thus support the occupant at this point and counteract any tendency for him to slump down in his seat and assume an improper sitting posture.

The shape of the cushion is such that it supports the occupant in a correct sitting posture and does this without giving the occupant any discomfort. In fact, on the other hand, the use of the improved cushion gives the occupant of the seat a sense of ease and comfort while at the same time correcting any tendency to assume an improper posture.

We claim.

1. An auxiliary seat back comprising a central relatively stiff member and two wings in the form of cushion members, one on each side of the central member, the central member being secured in position between the two wing members, each wing member having a progressively increasing thickness in a horizontal direction from the central member to the outer edge and from its lower to its upper portion, whereby there is provided on each wing a thickened portion at the upper outer part thereof, and also having a flat back face and a convex front face, and means for supporting said auxiliary cushion on the back of the seat so that it will fit the small of the occupant's back.

2. An auxiliary cushion comprising a central section of relatively stiff material and two wing sections, one on each side of the central section and each in the form of a cushion member, the central section being secured in position between the two wing sections, each wing section having a progressively increasing horizontal dimension from its inner edge to its outer edge and from its lower to its upper portion, whereby there is provided on each wing section a thickened portion at the upper outer part thereof, each wing section also having a flat back face and a convex front face, the thickest portion of each wing section in a vertical direction being nearer the top than the bottom.

In testimony whereof we have signed our names to this specification.

CLARENCE E. WHEELER.
EDWARD W. GOODLETT.